US012606006B2

(12) United States Patent

Hwang et al.

(10) Patent No.: US 12,606,006 B2
(45) Date of Patent: Apr. 21, 2026

(54) VEHICLE COOLING MODULE

(71) Applicant: Hanon Systems, Daejeon (KR)

(72) Inventors: Young Kook Hwang, Daejeon (KR); Hyuk Kim, Daejeon (KR); Ho Chang Sim, Daejeon (KR); Shin-Won Yun, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 200 days.

(21) Appl. No.: 18/278,137

(22) PCT Filed: May 16, 2022

(86) PCT No.: PCT/KR2022/006975
§ 371 (c)(1),
(2) Date: Aug. 21, 2023

(87) PCT Pub. No.: WO2022/245073
PCT Pub. Date: Nov. 24, 2022

(65) Prior Publication Data
US 2024/0317041 A1 Sep. 26, 2024

(30) Foreign Application Priority Data

May 20, 2021 (KR) ........................ 10-2021-0064873

(51) Int. Cl.
*B60K 11/04* (2006.01)
(52) U.S. Cl.
CPC .................................... *B60K 11/04* (2013.01)
(58) Field of Classification Search
CPC ................................ B60K 11/04; B60K 11/06

USPC ....................................................... 180/68.4
See application file for complete search history.

(56) References Cited

U.S. PATENT DOCUMENTS

| | | | | | |
|---|---|---|---|---|---|
| 5,657,817 A | * | 8/1997 | Heine | ..................... | F28F 9/002 |
| | | | | | 165/140 |
| 5,996,684 A | | 12/1999 | Clifton et al. | | |
| 6,237,676 B1 | * | 5/2001 | Hasegawa | ............ | F28D 1/0435 |
| | | | | | 165/41 |
| 7,703,730 B2 | * | 4/2010 | Best, Jr. | ................... | F01P 3/18 |
| | | | | | 165/41 |
| 9,823,027 B2 | * | 11/2017 | Armsden | .............. | F28F 21/062 |
| 9,903,261 B2 | * | 2/2018 | Tanahashi | .............. | H01T 19/00 |

(Continued)

FOREIGN PATENT DOCUMENTS

| | | |
|---|---|---|
| CN | 209756790 U | 12/2019 |
| JP | 2002098113 A | 4/2002 |

(Continued)

OTHER PUBLICATIONS

International Search Report issued in PCT/KR2022/006975 on Aug. 18, 2022.

*Primary Examiner* — Hau V Phan
(74) *Attorney, Agent, or Firm* — NORTON ROSE FULBRIGHT US LLP

(57) ABSTRACT

The present invention relates to a vehicle cooling module in which a plurality of unit modules is coupled by means of a fastening part and a connection bracket, and more particularly, to a vehicle cooling module including a fastening part that pulls a connection bracket, which is inserted into a hollow portion, to an inner wall to prevent the connection bracket from being damaged by an external force or vibration.

12 Claims, 9 Drawing Sheets

(56)            References Cited

U.S. PATENT DOCUMENTS

| | | | | |
|---|---|---|---|---|
| 2002/0056541 | A1* | 5/2002 | Kokubunji | B60K 11/04 |
| | | | | 165/149 |
| 2002/0073730 | A1* | 6/2002 | Shibata | F25B 39/04 |
| | | | | 62/509 |
| 2007/0062671 | A1* | 3/2007 | Sugimoto | F28D 1/0452 |
| | | | | 165/140 |
| 2015/0047814 | A1* | 2/2015 | Wilkins | F28D 1/0435 |
| | | | | 165/169 |
| 2017/0166043 | A1* | 6/2017 | Yun | B60K 11/06 |
| 2018/0347446 | A1* | 12/2018 | Han | F01P 3/18 |
| 2019/0001807 | A1* | 1/2019 | Han | F28F 9/002 |

FOREIGN PATENT DOCUMENTS

| | | | |
|---|---|---|---|
| KR | 200424118 | Y1 | 8/2006 |
| KR | 20110080248 | A | 7/2011 |
| KR | 101499014 | B1 | 3/2015 |

* cited by examiner

PRIOR ART

VEHICLE COOLING MODULE

CROSS REFERENCE TO RELATED APPLICATIONS

This patent application is a national phase under 35 U.S.C. § 371 of International Patent Application No. PCT/KR2022/006975 filed May 16, 2022, which claims the benefit of priority from Korean Patent Application No. 10-2021-0064873 filed May 20, 2021, each of which is hereby incorporated herein by reference in its entirety for all purposes.

TECHNICAL FIELD

The present disclosure relates to a vehicle cooling module, and more particularly, to a vehicle cooling module in which a plurality of unit modules is coupled by means of a fastening part and a connection bracket.

BACKGROUND ART

In general, not only components such as an engine for operating a vehicle are provided in an engine room of the vehicle, but also various heat exchangers such as a radiator, an intercooler, an evaporator, and a condenser for cooling the components such as the engine in the vehicle or adjusting an air temperature in an interior of the vehicle are provided in the engine room of the vehicle. In general, heat exchange media flow in the heat exchangers. The heat exchange medium in the heat exchanger exchanges heat with outside air present outside the heat exchanger, such that the cooling operation or the heat dissipation is performed. Therefore, outside air needs to be smoothly supplied into the engine room in order to stably operate various heat exchangers in the engine room of the vehicle. Hereinafter, the heat exchangers, which are provided to cool vehicle components or a vehicle interior as described above, are referred to as vehicle cooling modules.

In general, the vehicle cooling module may have a structure in which a plurality of radiators is coupled to one another or a structure in which a fan shroud, a condenser, or the like is coupled to a radiator. As a related technology, Korean Patent No. 10-1499014 (entitled "Radiator" and registered on May 27, 2015) has been proposed.

FIG. 1 is a perspective view of a vehicle cooling module in the related art. As illustrated, the cooling module in the related art has a structure in which a radiator 1 and a unit module 2 are coupled to each other by means of bracket modules 3. The bracket module 3 may be fixed to a tank that is a rigid member of the radiator 1. The unit module 2 may include a radiator, a condenser, a fan shroud, and the like. In this case, to solve a problem of damage, the related art provides a technology that may use the radiator without change by means of a replaceable bracket in case that a part of the bracket is damaged.

As described above, the bracket provided on the radiator is frequently damaged by an external force. There have been attempts to solve the problem by using a technology that adopts a partial replacement method or the like. However, because this technology is different from the technology for preventing damage, there is a problem in that it is impossible to prevent damage caused by an external force or vibration.

DISCLOSURE

Technical Problem

The present invention has been made in an effort to solve the above-mentioned problem, and an object of the present invention is to provide a vehicle cooling module including a fastening part that pulls a connection bracket, which is inserted into a hollow portion, to an inner wall to prevent the connection bracket from being damaged by an external force or vibration.

Technical Solution

An example of the present invention provides a vehicle cooling module including: a first unit module; and a second unit module, in which a fastening part is disposed on the first unit module, and a connection bracket coupled to the fastening part is disposed on the second unit module, in which the fastening part includes: an accommodation member fixed to the first unit module and configured such that the connection bracket is inserted into the accommodation member; and a pressing member fixed to the first unit module and configured to press the connection bracket inserted into the accommodation member, in which the accommodation member has a hollow portion opened in one direction, and in which the pressing member has a bent portion having one end fixed to the first unit module, and the other end protruding to the hollow portion.

The accommodation member may include a first body, a second body, and a third body, the first body and the second body may be connected, the second body and the third body may be connected, such that a hook structure opened toward one side is defined, and one end of the first body may further protrude to one side than one end of the third body.

The bent portion of the pressing member may be disposed to be spaced apart from one end of the first body to one side, and the bent portion may be inclined so that the other end thereof is directed toward the third body.

The first body may include a first surface contact portion being in contact with one surface of the connection bracket, and the third body may include a second surface contact portion being in contact with the other surface of the connection bracket, and a rib portion configured to connect one end of the second surface contact portion and the second body.

The third body may further include a guide portion connected to the other end of the second surface contact portion and inclined outward so that the hollow portion at one side is widened.

The rib portion may have a shape bent outward so that the hollow portion is widened.

A predetermined space may be defined between an end of the connection bracket and the connection body when the connection bracket is inserted into the accommodation member.

The connection bracket may be inserted into one surface side of the third body, and a groove may be recessed inward in a central portion of the other surface of the third body.

The first unit module may be a radiator, and the second unit module may be any one of a radiator, a condenser, and a fan shroud.

The connection bracket may include: a body portion at least partially inserted into the accommodation member and having one surface configured to be pressed by the pressing member; and a groove portion disposed in at least one of one surface and the other surface of the body portion, and the groove portion may be recessed to a predetermined depth.

The groove portion may be recessed in a hexagonal shape.

The groove portions may be disposed at symmetric positions on two opposite surfaces of the body portion.

Advantageous Effects

The vehicle cooling module of the present invention is configured such that one surface of the connection bracket, into which the bent portion of the pressing member is inserted, is pressed, such that the other surface of the connection bracket is in close contact with one surface of the third body of the accommodation member. Therefore, it is possible to improve durability by preventing the occurrence of a gap with the connection bracket. In addition, it is possible to further improve vibration durability by preventing the fastening part from being scratched by vibration.

In addition, in the vehicle cooling module of the present invention, the groove may be recessed in the central portion of the other surface of the third body of the accommodation member, and the two protruding portions may protrude from the outer portion of the third body, thereby preventing deformation and damage.

In addition, in the vehicle cooling module of the present invention, the groove portion having a hexagonal shape may be formed in the connection bracket to prevent bubbles from occurring in the vehicle cooling module, thereby improving the performance of the device.

MODE FOR INVENTION

Hereinafter, the present invention will be described with reference to the accompanying drawings.

Figure 1:
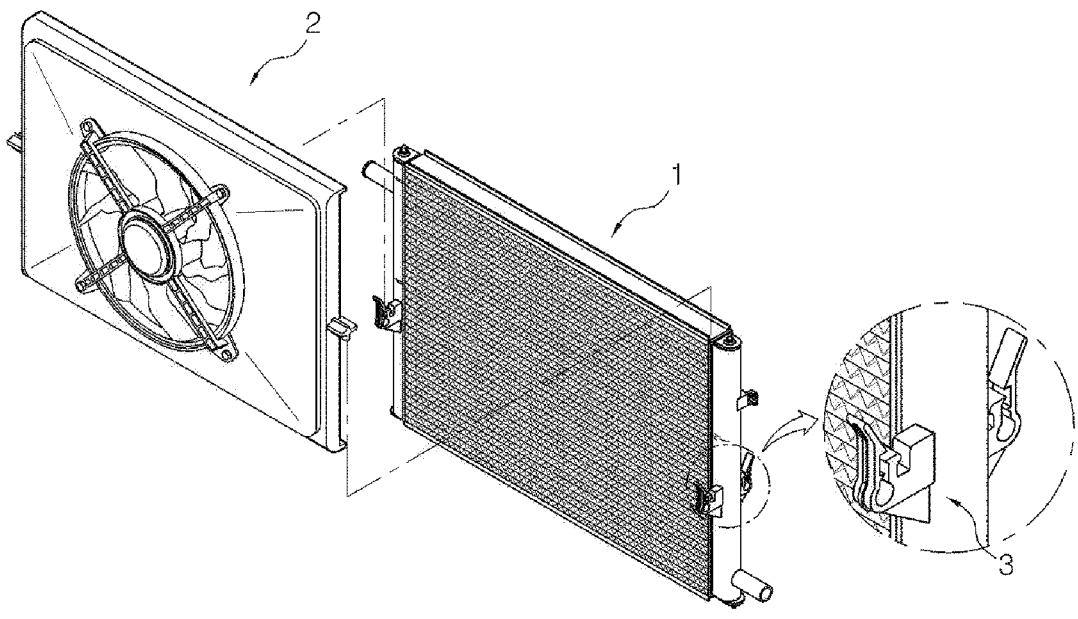
FIG. 1 is a perspective view of a vehicle cooling module in the related art.
Figure 2:
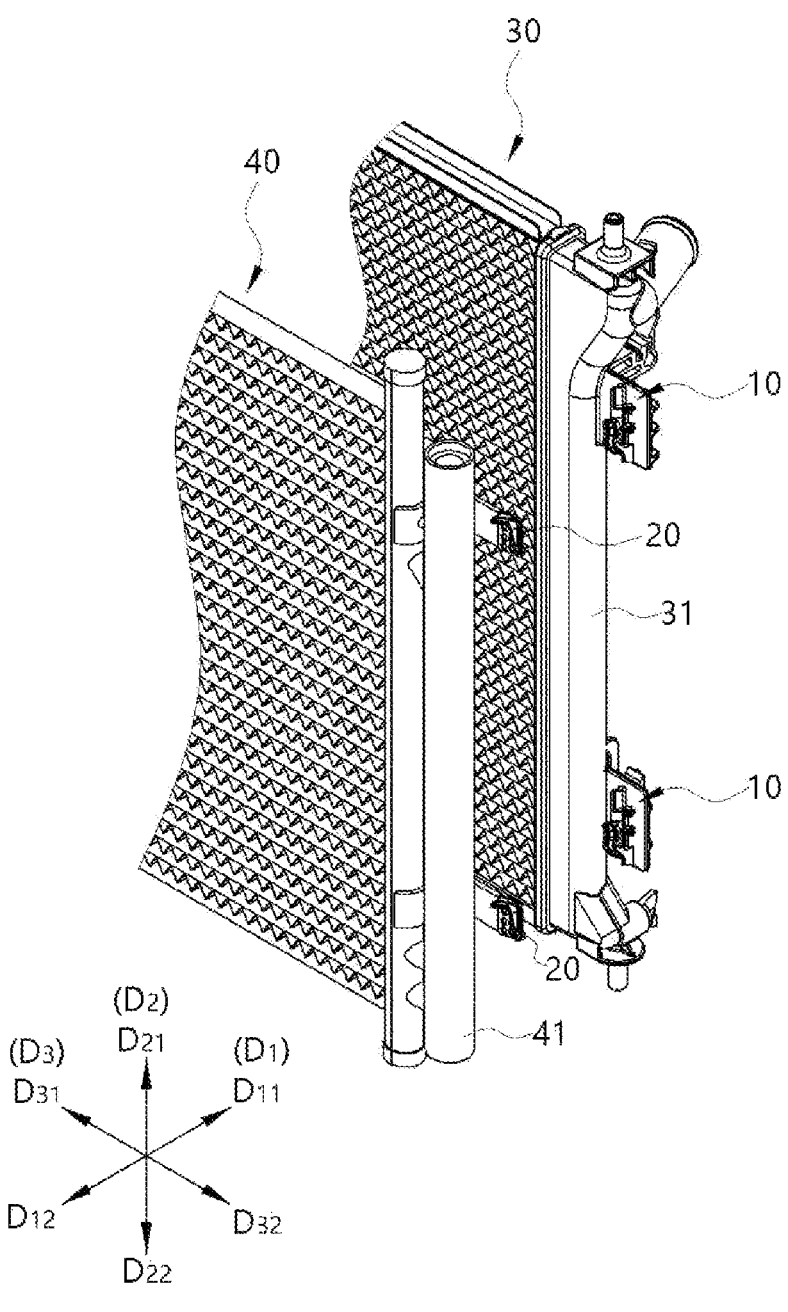
FIG. 2 is a perspective view of a vehicle cooling module according to an example of the present invention.

FIG. 2 is a perspective view of a vehicle cooling module according to an example of the present invention. As illustrated, the vehicle cooling module of the present invention includes first and second unit modules 30 and 40 coupled to each other. A fastening part 10 and a connection bracket 20 may be respectively disposed on the first unit module 30 and the second unit module 40. That is, the fastening part 10 may be provided at one side of the first unit module 30. The connection bracket 20 may be provided at one side of the second unit module 40, i.e., at a position corresponding to the fastening part 10 provided at one side of the first unit module 30.

More specifically, the fastening part 10 may be coupled to a first rigid member 31 of the first unit module 30, and the connection bracket 20 may be coupled to a second rigid member 41 of the second unit module 40. In case that the first unit module 30 or the second unit module 40 is a radiator, the first rigid member 31 or the second rigid member 41 is configured as a separate member coupled to a tank side housing or a tank housing, such that the position of the fastening part 10 and the position of the connection bracket 20 may be fixed to the first rigid member 31 or the second rigid member 41. The tank of the radiator may be made of various materials, for example, polypropylene (PP).

The first unit module 30 and the second unit module 40 may be implemented as various devices. For example, the first unit module 30 may be implemented as a radiator, and the second unit module 40 may be implemented as a radiator, a condenser, a fan shroud, or the like. FIG. 2 illustrates an example in which the first unit module 30 and the second unit module 40 are each implemented as the radiator.

In the following description, a direction in which the first unit module 30 and the second unit module 40 are coupled to each other is defined as a forward/rearward direction $D_1$. A direction in which the first unit module 30 is disposed based on the second unit module 40 is defined as a forward direction $D_{11}$, and a direction opposite to the forward direction is defined as a rearward direction $D_{12}$. In addition, a direction in which a tube is disposed to be spaced apart from a pin-tube-shaped radiator is defined as an upward/downward direction $D_2$. A direction in which the fastening part 10 is opened is defined as an upward direction $D_{21}$, and a direction opposite to the upward direction is defined as a downward direction $D_{22}$. In addition, a direction in which the connection bracket 20 extends is defined as a leftward/rightward direction $D_3$. A direction in which the second unit module 40 is disposed based on the connection bracket 20 is defined as a leftward direction $D_{31}$, and a direction opposite to the leftward direction is defined as a rightward direction $D_{32}$.

Figure 3:
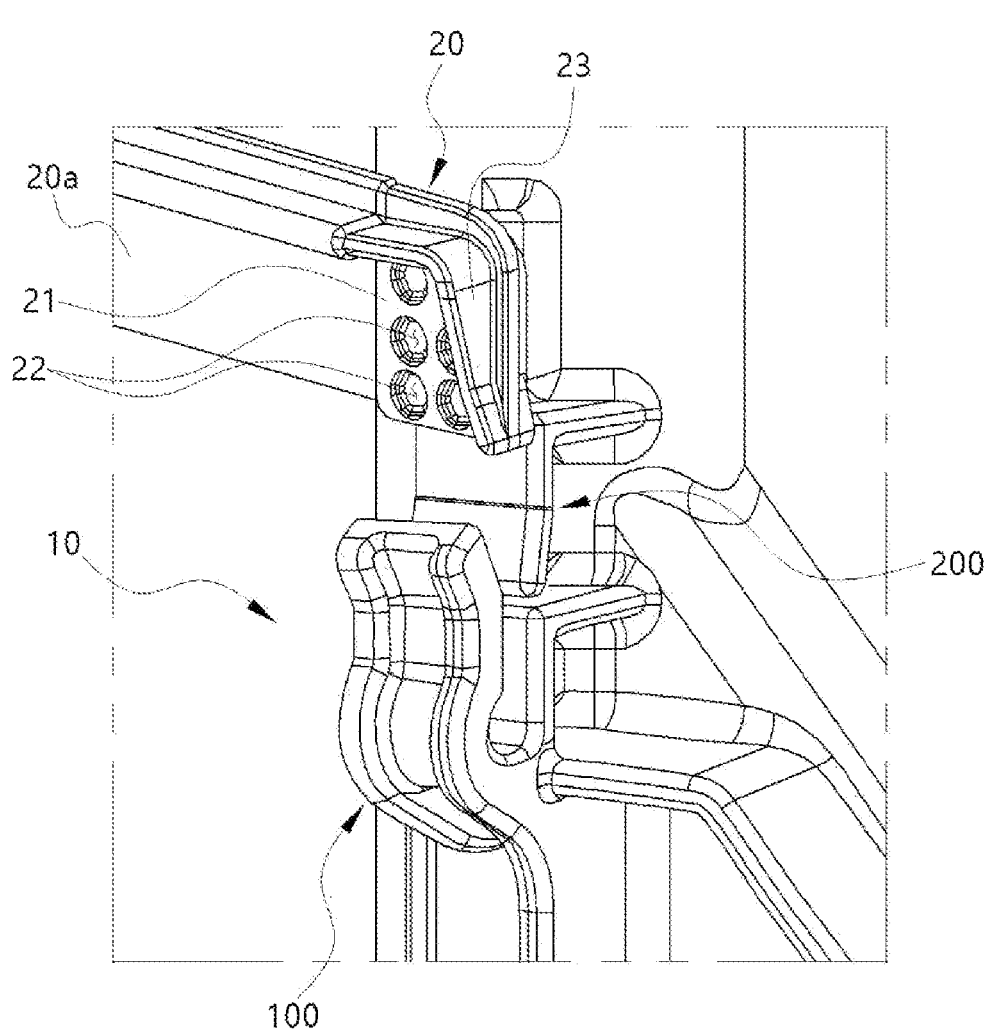
FIG. 3 is a perspective view illustrating a state in which a fastening part and a connection bracket are coupled.
Figure 4:
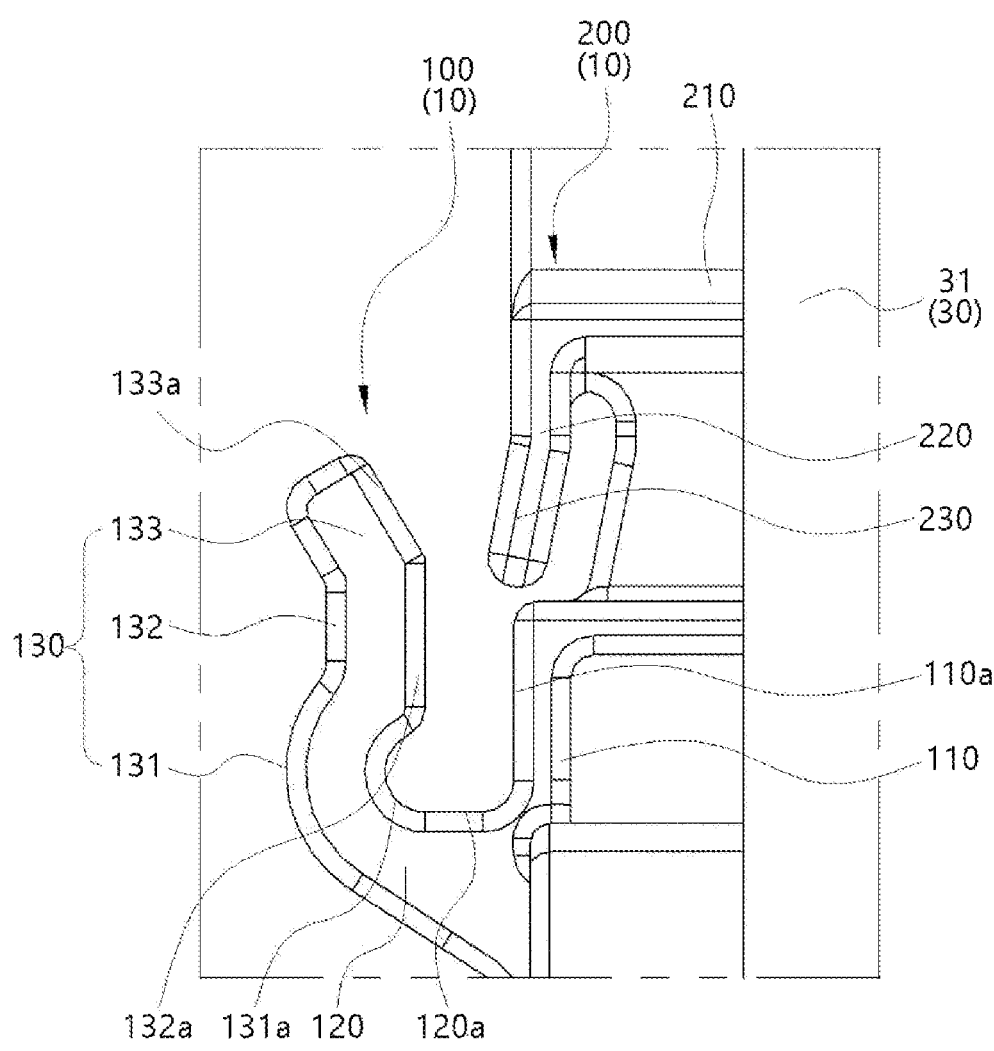
FIGS. 4 and 5 are side views of the fastening part.
Figure 5:
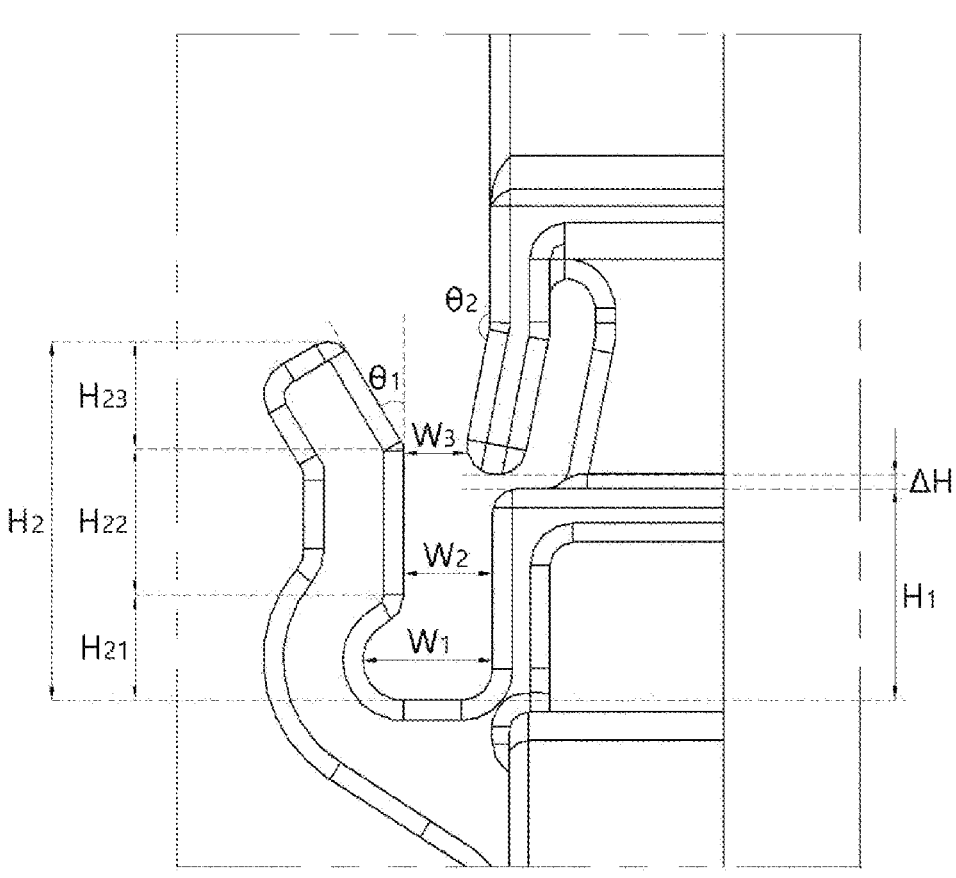

FIG. 3 is a perspective view illustrating a state in which the fastening part and the connection bracket are coupled, and FIGS. 4 and 5 are side views of the fastening part.

With reference to FIG. 3, the fastening part 10 of the present invention may include an accommodation member 100 and a pressing member 200. A body portion 21 of the connection bracket 20 may be inserted and fixed into the accommodation member 100.

The connection bracket 20 may include a connection shaft 20a extending in the leftward/rightward direction and having one end fixed to the second rigid member 41 of the second unit module 40, and the body portion 21 disposed at the other end of the connection shaft 20a.

The accommodation member 100 may have a hook structure penetrated in the leftward/rightward direction and opened at an upper side thereof. The fastening part 10 and the connection bracket 20 may each be made of one of olefin-based or amide-based polymer materials. For example, the fastening part 10 and the connection bracket 20 may each be made of polypropylene (PP) or polyamide (PA). As an example of a commercially available product, the fastening part 10 may be made of PP-GF40, and the connection bracket 20 may be made of PP-GF40 or PA66-GF30.

The pressing member 200 may be formed to press the body portion 21 of the connection bracket 20 when the body portion 21 of the connection bracket 20 is inserted into the accommodation member 100. That is, the pressing member 200 may be configured to press an upper portion of a front surface of the body portion 21 when a lower portion of the front surface and a rear surface of the body portion 21 are inserted into the accommodation member 100. Therefore, a rear surface of the pressing member 200 and an inner surface of a rear side of the accommodation member 100 may be in close contact with each other.

The connection bracket 20 may further include one or more groove portions 22 disposed and recessed in the front or rear surface of the body portion 21. The groove portion 22 may suppress the occurrence of inside bubbles.

In addition, the connection bracket 20 may further include a cover portion 23 protruding to a predetermined degree along a rim of the body portion 21. A width of the cover portion 23 in the forward/rearward direction may be larger than a width of the body portion 21 in the forward/rearward direction to prevent the body portion 210 from separating in the leftward/rightward direction and simultaneously or separately restrict an insertion depth of the body portion 21.

With reference to FIGS. 4 and 5, the accommodation member 100 includes a first body 110, a second body 120, and a third body 130 that are connected to one another. The first body 110 and the second body 120 are connected, and the second body 120 and the third body 130 are connected, such that a hook structure, which is opened at an upper side, a left side, and a right side and closed at a front side, a rear side, and a lower side, may be defined. That is, the first body 110 and the third body 130 are spaced apart from each other in the forward/rearward direction, such that a hollow portion, which is opened at an upper side thereof, may be defined between the first body 110 and the third body 130.

The first body 110 may be fixed to the first rigid member 31 of the first unit module 30, and the first body 110 has a first height $H_1$ in the upward/downward direction. The second body 120 may extend in the forward/rearward direction and connect the first body 110 and the third body 130. The third body 130 may have a second height $H_2$ in the upward/downward direction. In this case, the first height H1 and the second height H2 each correspond to a length in the upward direction based on a bottom portion 120a that is an upper surface of the second body 120. In this case, the second height $H_2$ is larger than the first height $H_1$, such that an upper end of the first body 110 may be disposed below an upper end of the third body 130.

The pressing member 200 may include a bent portion 230 disposed to be spaced apart from an upper side of the first body 110 at a predetermined height ($\Delta H$), and a fixing portion configured to fix one end of the bent portion 230 to the first rigid member 31. The fixing portion may have various shapes. For example, the fixing portion may include a first fixing portion 210 extending in the forward/rearward direction, and a second fixing portion 220 extending in the upward/downward direction. Further, an upper end of the bent portion 230 may be fixed to the fixing portion, and a lower end of the bent portion 230 may be disposed to be closer to the third body 130 than the upper end to the third body 130. That is, the lower end of the bent portion 230 may have a shape bent or inclined toward the third body 130. In case that the connection bracket 20 is inserted, the lower end of the bent portion 230 may be pressed forward, such that the bent portion 230 may press a rear side of the connection bracket 20 by means of a repulsive force.

The third body 130 may include a rib portion 131, a rigid portion 132, and a guide portion 133 sequentially connected to the second body 120. The rib portion 131 may have a shape bent rearward to a predetermined degree, and the rigid portion 132 may have a shape extending upward and downward. The guide portion 133 may have a shape bent or inclined rearward toward the upper end thereof. The rib portion 131 may have a recessed surface 131a recessed inward in an inner surface of a front side thereof. A length, which corresponds to a first width $W_1$, may be defined between the first body 110 and an innermost side of the recessed surface 131a. The first width $W_1$ may be calculated based on a first surface contact portion 110a of the first body 110. In addition, a length, which corresponds to a second width $W_2$, may be defined between the first surface contact portion 110a and a second surface contact portion 132a that is an inner surface of the rigid portion 132. In this case, because the rib portion 131 has a shape bent rearward, the first width $W_1$ may be larger than the second width $W_2$.

The guide portion 133 may be inclined rearward at a first angle $\theta_1$ to further facilitate the process of inserting the connection bracket 20. The bent portion 230 may also be inclined at a second angle $\theta_2$ with respect to a reference line in the upward direction of the upper end thereof. In this case, the first angle $\theta_1$ may be an acute angle ($0°<\theta_1<90°$, and the second angle $\theta_2$ may be an obtuse angle ($90°<\theta_2<180°$).

A part of a lower end of the bent portion 230 may be disposed at a height corresponding to the second surface contact portion 132a that is the inner surface of the rigid portion 132. Therefore, a third width $W_3$ may be defined between a part of the lower end of the bent portion 230 and the second surface contact portion 132a. In this case, because the bent portion 230 has a shape bent rearward, the third width $W_3$ may be smaller than the second width $W_2$.

As described above, the first body 110 and the third body 130 may have the first height $H_1$ and the second height $H_2$ in the upward/downward direction based on the upper surface of the second body 120. The lower end of the bent portion 230 may be disposed to be spaced apart upward from the first body 110 at a predetermined height ($\Delta H$). In this case, the rib portion 131, the rigid portion 132, and the guide portion 133 of the third body 130 may respectively have a second-first height $H_{21}$, a second-the second height $H_{22}$, and a second-third height $H_{23}$. In this case, a sum of the first height $H_1$ and the predetermined height ($\Delta H$) is smaller than a sum of the second-first height $H_{21}$ and the second-the second height $H_{22}$, such that a part of the upper end of the rigid portion 132 and a part of the lower end of the bent portion 230 may face each other.

Figure 6:
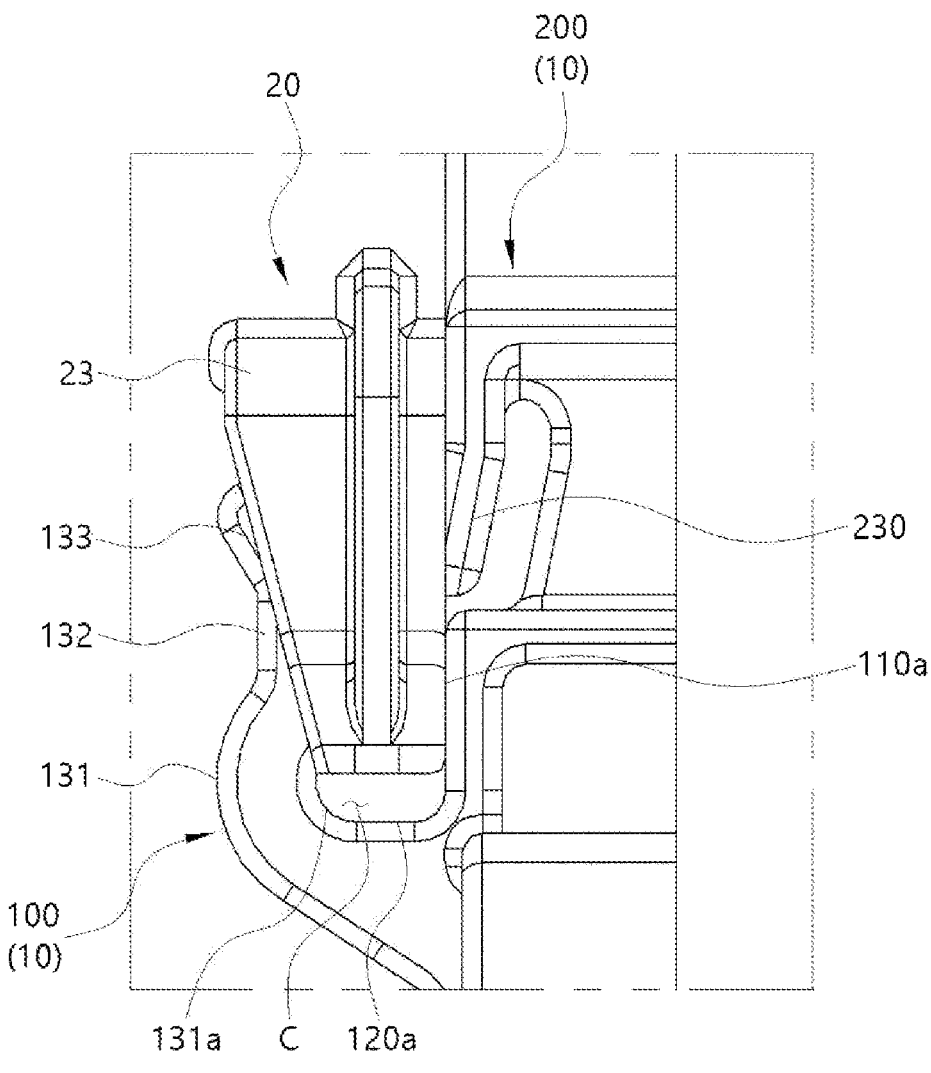
FIG. 6 is a side view illustrating a state in which the fastening part and the connection bracket are coupled to each other.
Figure 7:
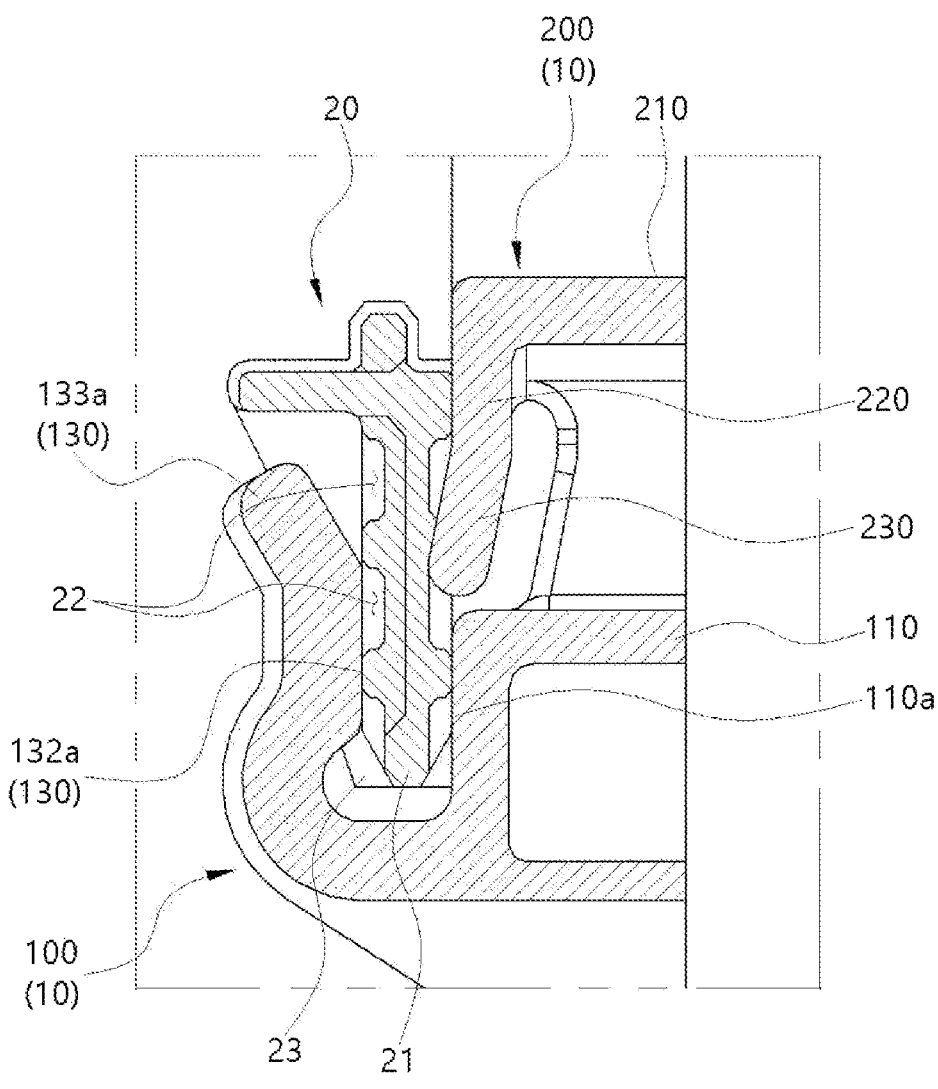
FIG. 7 is a cross-sectional side view of FIG. 6.

FIG. 6 is a side view of the fastening part and the connection bracket coupled to each other, and FIG. 7 is a cross-sectional side view of FIG. 6. With reference to FIGS. 6 and 7, when the connection bracket 20 is inserted into the fastening part 10, the lower surface of the connection bracket 20 and the upper surface of the second body 120 are spaced apart from each other, such that a space C may be defined between the lower surface of the connection bracket 20 and the upper surface of the second body 120. In this case, as described above, a depth to which the connection bracket 20 is inserted may be adjusted by the cover portion 23 at the upper end side of the connection bracket 20. Alternatively, the insertion depth may be restricted by a separate stopper. Further, the front and rear surfaces of the body portion 21 of the connection bracket 20 may be interposed between the first surface contact portion 110a, which is the inner surface of the first body 110, and the second surface contact portion 132a that is the inner surface of the rigid portion 132. The lower end of the bent portion 230 may press the front surface of the body portion 21, such that the rear surface of the body portion 21 may be further in close contact with the second surface contact portion 132a. In this case, a plurality of groove portions 22 may be recessed in the body portion 21. Some of the groove portions 22 may be disposed at heights corresponding to the second surface contact portion 132a.

Figure 8:
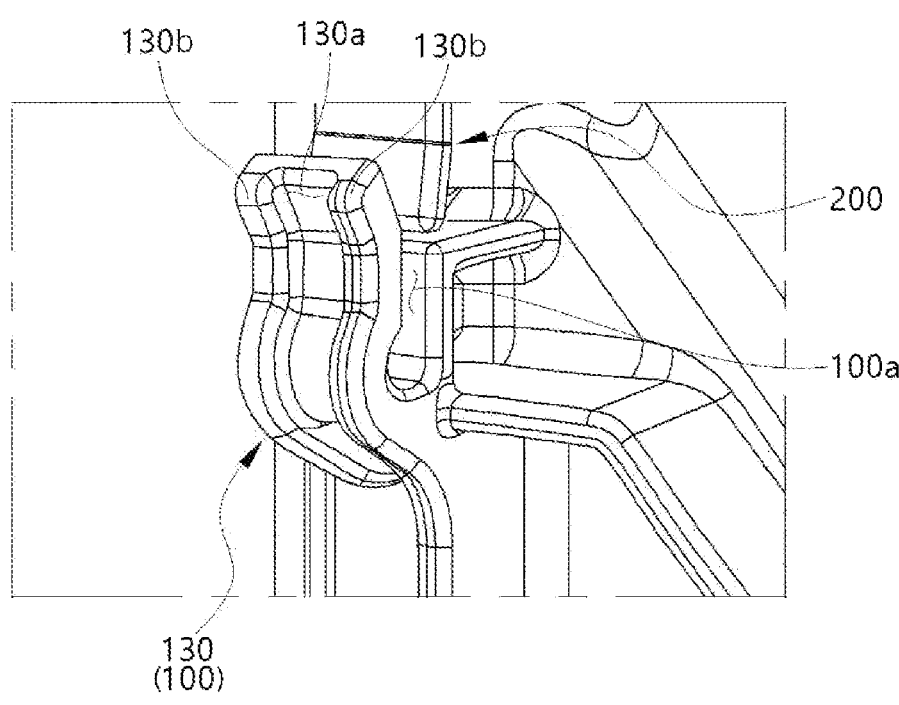
FIG. 8 is an enlarged perspective view of a third body of the fastening part.

FIG. 8 is an enlarged perspective view of the third body of the fastening part. With reference to FIG. 8, the connection bracket 20 may be inserted into a front side of the third body 130, i.e., a hollow portion 100a, and a central portion of a rear surface of the third body 130 may be recessed inward. Therefore, the third body 130 may include a groove 130a recessed inward in the central portion of the rear surface thereof and extending in the upward/downward direction, and a pair of protruding portions 130b respectively disposed at left and right sides of the groove 130a and protruding rearward. Therefore, the deformation and damage caused by tension may be prevented, thereby improving the durability of the device.

Figure 9:
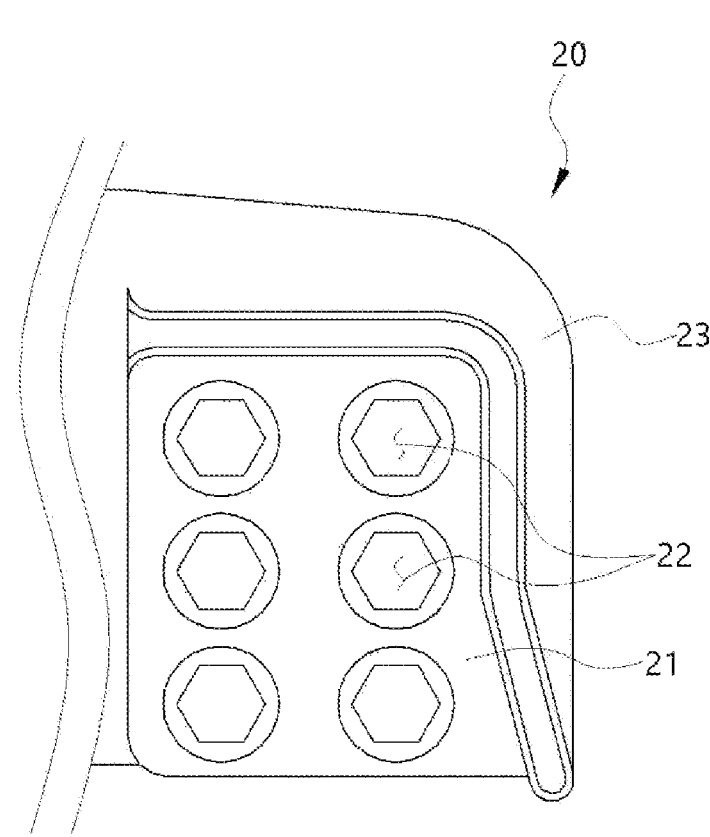
FIG. 9 is a front view illustrating an end of the connection bracket.

FIG. 9 is a front view illustrating an end of the connection bracket. With reference to FIG. 9, the one or more groove portions 22 disposed on the body portion 21 may each be recessed at least in a hexagonal shape. In this case, the plurality of groove portions 22 may be disposed to be spaced apart from one another in the upward/downward direction or the leftward/rightward direction. The groove portion 22 having a hexagonal shape may suppress the occurrence of inside bubbles. Therefore, the vehicle cooling module may be used for a longer period of time, and maintenance costs for the cooling module may be reduced.

The present invention is not limited to the above embodiments, and the scope of application is diverse. Of course, various modifications and implementations made by any person skilled in the art to which the present invention pertains without departing from the subject matter of the present invention claimed in the claims.

DESCRIPTION OF REFERENCE NUMERALS

10: Fastening part
20: Connection bracket
20a: Connection shaft
21: Body portion
22: Groove portion
23: Cover portion
30: First unit module
31: First rigid member
40: Second unit module
41: Second rigid member
100: Accommodation member
100a: Hollow portion
110: First body
110a: First surface contact portion
120: Second body
120a: Bottom portion
130: Third body
130a: Groove
130b: Protruding portion
131: Rib portion
131a: Recessed surface
132: Rigid portion
132a: Second surface contact portion
133: Guide portion
133a: Guide surface
200: Pressing member
210: First fixing portion
220: Second fixing portion
230: Bent portion
What is claimed is:

1. A vehicle cooling module comprising:
a first unit module; and
a second unit module,
wherein a fastening part is disposed on the first unit module, and a connection bracket coupled to the fastening part is disposed on the second unit module,
wherein the fastening part comprises:
an accommodation member fixed to the first unit module and configured such that the connection bracket is inserted into the accommodation member; and

8 a pressing member fixed to the first unit module and configured to press the connection bracket inserted into the accommodation member,
wherein the accommodation member has a hollow portion opened in one direction, and
wherein the pressing member has a bent portion having one end fixed vertically to the first unit module, and another end protruding at an angle to the hollow portion.

2. The vehicle cooling module of claim 1, wherein the accommodation member comprises a first body, a second body, and a third body, wherein the first body and the second body are connected, and the second body and the third body are connected, such that a hook structure opened toward one side is formed, and wherein one end of the first body further protrudes to one side than one end of the third body.

3. The vehicle cooling module of claim 2, wherein the bent portion of the pressing member is disposed to be spaced apart from one end of the first body to one side.

4. The vehicle cooling module of claim 2, wherein the first body comprises a first surface contact portion being in contact with one surface of the connection bracket, and wherein the third body comprises a second surface contact portion being in contact with the other surface of the connection bracket, and a rib portion configured to connect one end of the second surface contact portion and the second body.

5. The vehicle cooling module of claim 4, wherein the third body further comprises a guide portion connected to the other end of the second surface contact portion and inclined outward so that the hollow portion at one side is widened.

6. The vehicle cooling module of claim 4, wherein the rib portion has a shape bent outward so that the hollow portion is widened.

7. The vehicle cooling module of claim 2, wherein a predetermined space is defined between an end of the connection bracket and the connection body when the connection bracket is inserted into the accommodation member.

8. The vehicle cooling module of claim 2, wherein the connection bracket is inserted into one surface side of the third body, and a groove is recessed inward in a central portion of the other surface of the third body.

9. The vehicle cooling module of claim 1, wherein the first unit module is a radiator, and the second unit module is any one of a radiator, a condenser, and a fan shroud.

10. The vehicle cooling module of claim 1, wherein the connection bracket comprises:
a body portion at least partially inserted into the accommodation member and having one surface configured to be pressed by the pressing member; and
a groove portion disposed in at least one of one surface and the other surface of the body portion, and
wherein the groove portion is recessed to a predetermined depth.

11. The vehicle cooling module of claim 10, wherein the groove portion is recessed in a hexagonal shape.

12. The vehicle cooling module of claim 10, wherein the groove portions are disposed at symmetric positions on two opposite surfaces of the body portion.

* * * * *